US012602642B2

(12) United States Patent
Miura et al.

(10) Patent No.: US 12,602,642 B2
(45) Date of Patent: Apr. 14, 2026

(54) INFORMATION PROCESSING DEVICE AND INFORMATION PROCESSING METHOD DETERMINING CONTROL METHOD FOR A PLURALITY OF MOVABLE APPARATUSES UTILIZING A FACILITY

(71) Applicant: CANON KABUSHIKI KAISHA, Tokyo (JP)

(72) Inventors: Shoko Miura, Tokyo (JP); Masakazu Fujiki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 289 days.

(21) Appl. No.: 18/502,351

(22) Filed: Nov. 6, 2023

(65) Prior Publication Data

US 2024/0161048 A1      May 16, 2024

(30) Foreign Application Priority Data

Nov. 14, 2022      (JP) ................................. 2022-181547

(51) Int. Cl.
*G06Q 10/08*         (2024.01)
*G05D 1/646*         (2024.01)

(52) U.S. Cl.
CPC ............. *G06Q 10/08* (2013.01); *G05D 1/646* (2024.01)

(58) Field of Classification Search
CPC ................................. G06Q 10/08; G05D 1/646
See application file for complete search history.

(56) References Cited

U.S. PATENT DOCUMENTS

| | | | | |
|---|---|---|---|---|
| 8,886,390 | B2 * | 11/2014 | Wolfe | .............. G05B 19/41895 |
| | | | | 701/1 |
| 11,185,977 | B2 | 11/2021 | Kobayashi | |
| 2007/0112461 | A1 * | 5/2007 | Zini | ........................ G05D 1/028 |
| | | | | 700/245 |
| 2013/0085625 | A1 * | 4/2013 | Wolfe | ................ G05B 23/0272 |
| | | | | 701/1 |
| 2021/0149390 | A1 * | 5/2021 | Hyvärinen | .............. G08G 1/202 |
| 2022/0198355 | A1 * | 6/2022 | Menachem | ........ G06Q 30/0284 |
| 2023/0030791 | A1 | 2/2023 | Miyatani | |
| 2023/0110992 | A1 | 4/2023 | Numakami | |

(Continued)

FOREIGN PATENT DOCUMENTS

JP          3588313 B2      11/2004

OTHER PUBLICATIONS

U.S. Appl. No. 18/377,322, filed Oct. 6, 2023 by Yoshihiro Naganawa, et al.

(Continued)

*Primary Examiner* — Ramsey Refai
(74) *Attorney, Agent, or Firm* — VENABLE LLP

(57) ABSTRACT

An information processing device for reducing a loss in a movable apparatus and a facility acquires operation plans of a plurality of movable apparatuses; acquires restriction information on a facility to be utilized by the movable apparatuses; calculates, regarding a plurality of candidates for a control method for the movable apparatuses and the facility for the movable apparatuses utilizing the facility on the basis of at least the restriction information, a loss caused in a case in which each of the candidates is performed; and determines a control method from the candidates on the basis of the losses calculated by the loss calculation unit.

8 Claims, 7 Drawing Sheets

300

(56)          References Cited

U.S. PATENT DOCUMENTS

| 2023/0134912 A1 | 5/2023 | Wanda |
| 2023/0243667 A1 | 8/2023 | Miyakawa |
| 2023/0342956 A1 | 10/2023 | Ohira |

OTHER PUBLICATIONS

U.S. Appl. No. 18/493,368, filed Oct. 24, 2023 by Hitoshi Fukamachi, et al.

U.S. Appl. No. 18/387,884, filed Nov. 8, 2023 by Yukio Numakami, et al.

U.S. Appl. No. 18/522,615, filed Nov. 29, 2023 by Shinji Ohira, et al.

* cited by examiner

START

ACQUIRE OPERATION PLAN OF MOVABLE APPARATUS ~ S400

ACQUIRE RESTRICTION INFORMATION OF FACILITY ~ S401

DETERMINE CANDIDATES FOR CONTROL METHOD ~ S402

CALCULATE LOSS ~ S403

DETERMINE CONTROL METHOD ~ S404

CONTROL MOVABLE APPARATUS ~ S405

CONTROL DOOR ~ S406

END

INFORMATION PROCESSING DEVICE AND INFORMATION PROCESSING METHOD DETERMINING CONTROL METHOD FOR A PLURALITY OF MOVABLE APPARATUSES UTILIZING A FACILITY

BACKGROUND OF THE INVENTION

Field of the Invention

The present invention relates to an information processing device for controlling a movable apparatus, an information processing method, and a storage medium.

Description of the Related Art

Autonomously traveling movable apparatuses are becoming widespread, and environments in which they are utilized, such as commercial facilities, are expanding. Under these circumstances, movable apparatuses have come to utilize facilities such as automatic doors and elevators, and there is a demand for cooperation between movable apparatuses and facility systems and the like.

Japanese Patent No. 3588313 has proposed an automatic door and a control device for an automatic door, in which a plurality of movable apparatuses each issue a request for opening or closing an automatic door when the movable apparatuses pass through the automatic door and control is performed to enhance efficiency of opening and closing of the automatic door based on the number of issued requests for opening and closing the automatic door.

However, in the constitution in Japanese Patent No. 3588313, there is a problem that occurrence of a loss due to standby of movable apparatuses or building systems, energy consumption, and the like cannot be curbed.

SUMMARY OF THE INVENTION

In order to resolve the foregoing problems, an information processing device according to the present invention has at least one processor or circuit configured to function as: a movable apparatus operation plan acquisition unit configured to acquire operation plans of a plurality of movable apparatuses; a restriction information acquisition unit configured to acquire restriction information on a facility to be utilized by the movable apparatuses; a loss calculation unit configured to calculate, regarding a plurality of candidates for a control method for the movable apparatuses and the facility for the movable apparatuses utilizing the facility on the basis of at least the restriction information, a loss caused in a case in which each of the candidates is performed; and a control method determining unit configured to determine a control method from the candidates on the basis of the losses calculated by the loss calculation unit.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1A:
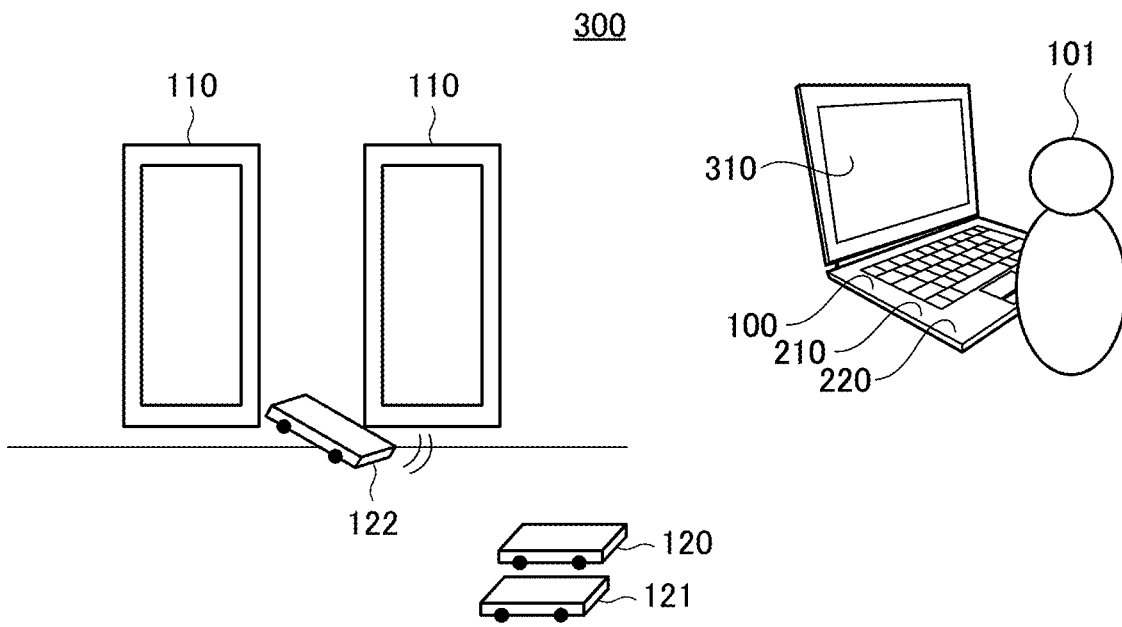
FIGS. 1A and 1B are explanatory views of an example of a constitution of an information processing system 300 according to First Embodiment of the invention.
Figure 1B:
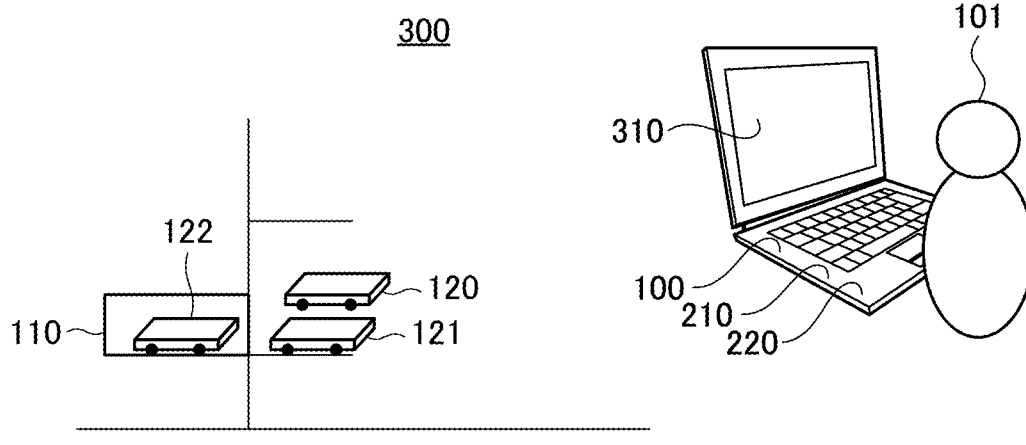

FIGS. 1A and 1B are explanatory views of an example of a constitution of an information processing system 300 according to First Embodiment of the invention. The reference sign 100 indicates an information processing device, the reference sign 101 indicates a user, the reference sign 110 indicates a building facility, FIG. 1A illustrates an example of an automatic door as a building facility, and FIG. 1B illustrates an example of an elevator as a building facility.

The reference signs 120 to 122 indicate movable apparatuses, the reference signs 210 and 220 respectively indicate a movable apparatus operation plan acquisition unit and a facility restriction information acquisition unit provided in the information processing device 100, and the reference sign 310 indicates a display device.

In First Embodiment, an information processing device for controlling operation of the building facility and utilization of the building facility by the movable apparatuses if a plurality of movable apparatuses utilize a building facility will be described. The information processing device 100 of First Embodiment can control opening and closing of the automatic door 110 and the movable apparatuses 120 to 122 passing through the automatic door.

In Examples, an example with three movable apparatuses will be described, but the number of apparatuses is not limited. In addition, in First Embodiment, an example of the automatic door 110 as a building facility will be described, but the building facility is not limited to this. For example, it may be an automatic shutter, an automatic gate, an elevator, or the like. Hereinafter, a building facility will also be referred to as a facility.

For example, the automatic door 110 of First Embodiment is installed at a doorway of a freezing storage warehouse. Therefore, it is desirable that it is closed as much as possible. The movable apparatuses are movable apparatuses which autonomously travel, and operation thereof is managed by the information processing device 100.

FIG. 1A is a view illustrating an example of a state in which the automatic doors and the movable apparatuses 120 to 122 are in operation, the movable apparatuses 120 and 121 are standing by in the vicinity of the automatic doors, and the movable apparatus 122 is utilizing the facility.

The movable apparatus operation plan acquisition unit 210 and the facility restriction information acquisition unit 220 are built into the information processing device 100.

Figure 2:
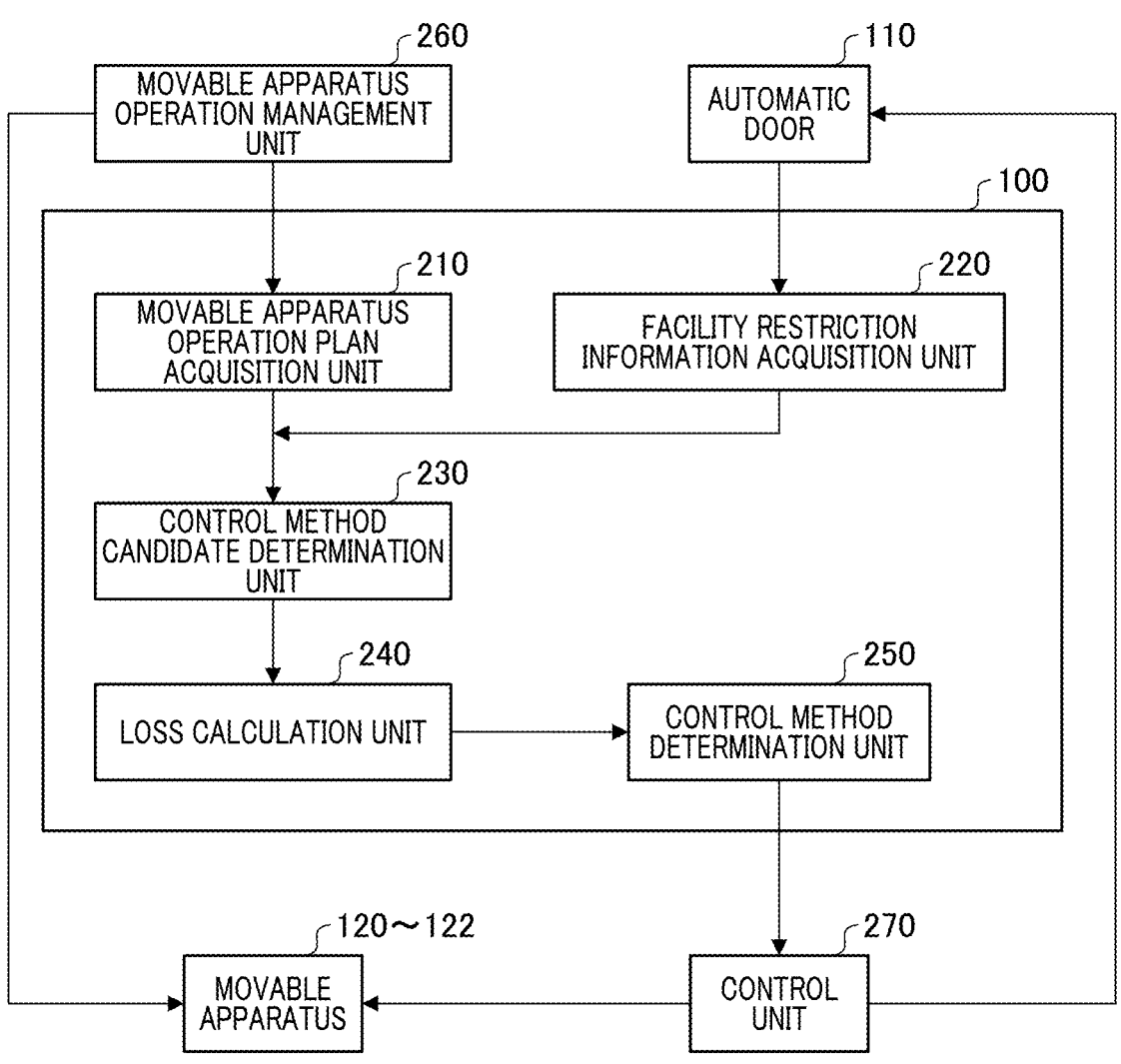
FIG. 2 is a functional block diagram of an information processing device 100 according to First Embodiment.

FIG. 2 is a functional block diagram of the information processing system 300 according to First Embodiment. A part of the functional block of the information processing system 300 shown in FIG. 2 is realized by causing a CPU serving as a computer included in the information processing device, an external server, or the like to execute a computer program stored in a memory serving as a storage medium.

However, some or all of them may be realized by hardware. A dedicated circuit (ASIC), a processor (reconfigurable processor, DSP), or the like can be used as hardware. The foregoing description related to FIG. 2 applies similarly to FIG. 5.

The information processing device 100 has the movable apparatus operation plan acquisition unit 210, the facility restriction information acquisition unit 220, a control method candidate determination unit 230, a loss calculation unit 240, a control method determination unit 250, and the like.

The movable apparatus operation plan acquisition unit 210 acquires identification information on the movable apparatuses 120 to 122 scheduled to utilize the automatic door 110 as a facility and future operation information on the movable apparatuses 120 to 122 scheduled to utilize the automatic door 110 from a movable apparatus operation management unit 260 which plans and manages operation of the movable apparatuses. That is, the movable apparatus operation plan acquisition unit 210 acquires operation plans of the plurality of movable apparatuses.

The facility restriction information acquisition unit 220 acquires restriction information when the movable apparatuses 120 to 122 utilize the automatic door. The control method candidate determination unit 230 determines candidates for a control method for the movable apparatuses 120 to 122 and the automatic door 110. That is, the facility restriction information acquisition unit 220 acquires restriction information on the facility utilized by the movable apparatuses.

The loss calculation unit 240 calculates a loss caused when the movable apparatuses 120 to 122 and the automatic door 110 are controlled by the control method for each of the candidates determined by the control method candidate determination unit 230. The loss calculation unit 240 calculates, regarding a plurality of candidates for the control method for the movable apparatuses and the facility for the movable apparatuses utilizing the facility on the basis of at least the restriction information, a loss caused if each of the candidates is performed.

The control method determination unit 250 determines a method for controlling the movable apparatuses 120 to 122 and the automatic door 110 such that they are in operation or standing by on the basis of the loss calculated by the loss calculation unit 240. That is, the control method determination unit 250 determines a control method from the foregoing candidates on the basis of the foregoing loss.

Figure 3:
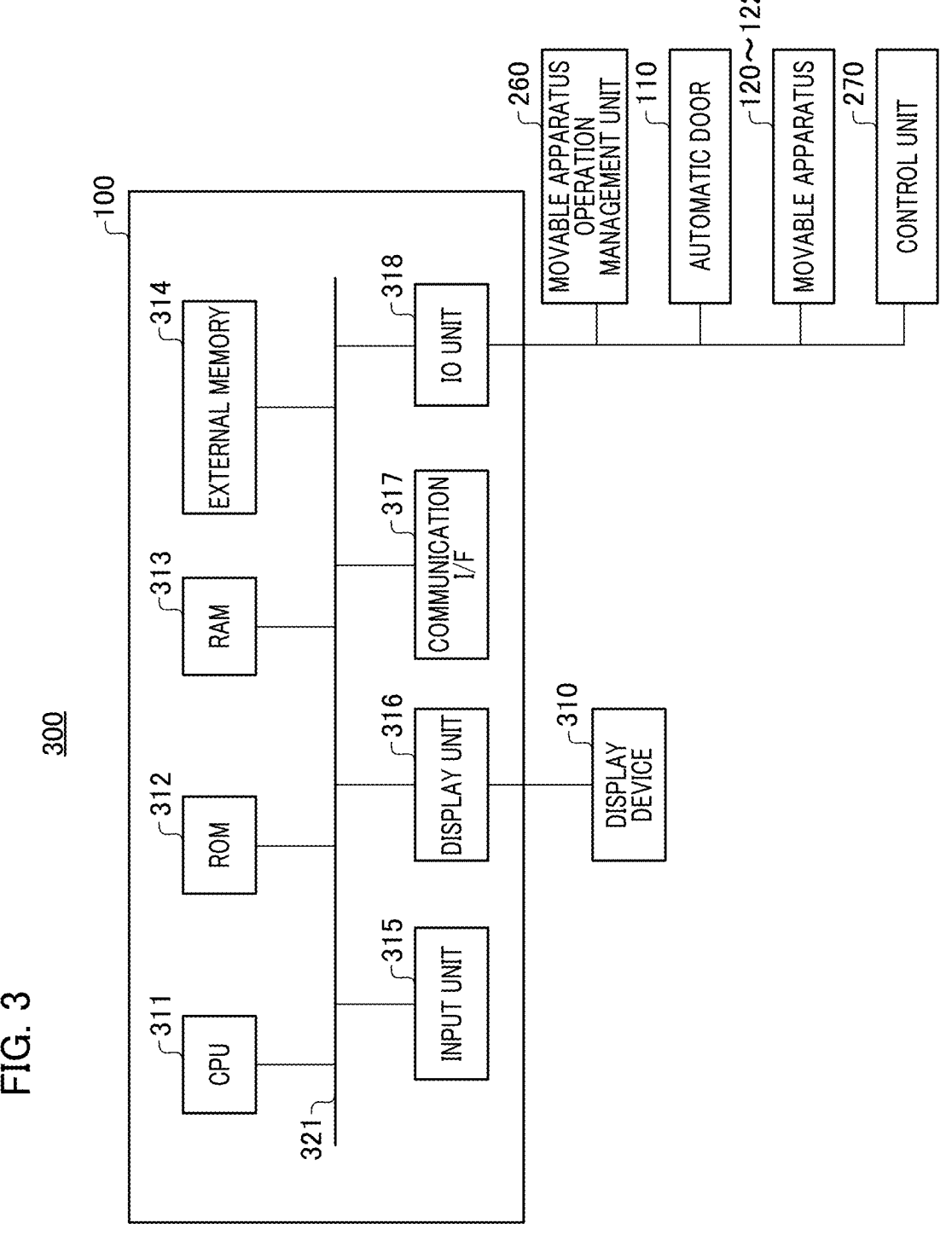
FIG. 3 is a block diagram showing a hardware constitution of the information processing device 100 according to First Embodiment.

FIG. 3 is a block diagram showing a hardware constitution of the information processing device 100 according to First Embodiment. The reference sign 311 indicates a CPU serving as a computer and functions as a control unit controlling operation of each unit of the device connected to a system bus 321 on the basis of a computer program stored in a memory (a ROM 312 or the like) serving as a storage medium.

The reference sign 312 indicates a ROM, which stores a BIOS program, a booting program, and other computer programs. The reference sign 313 indicates a RAM, which is used as a main storage device of the CPU 311. The reference sign 314 indicates an external memory such as an HDD or an SSD, which stores a computer program processed by the information processing device 100.

An input unit 315 performs processing related to an input of information and the like, such as a keyboard and a mouse. A display unit 316 causes the display device 310 to output computation results of the information processing device 100 in accordance with an instruction from 311. For example, the display device 310 is a liquid crystal display device, a projector, an LED indicator, or the like, of which the kind does not matter.

The reference sign 317 indicates a communication interface, which performs communication of information via a network. The communication interface may be Ethernet (registered trademark), a USB, serial communication, or radio communication, of which the kind does not matter. The communication interface 317 performs communication with an external server, saves various kinds of data in the external server, and acquires various kinds of data from the external server.

The reference sign 318 is an I/O, which inputs operation information on each of the movable apparatuses from the movable apparatus operation management unit 260 and restriction information when the movable apparatuses utilize the automatic door 110 as a facility from the automatic door 110. In addition, it outputs control details by a control unit 270 to the automatic door 110 and the movable apparatuses 120 to 122.

Figure 4:
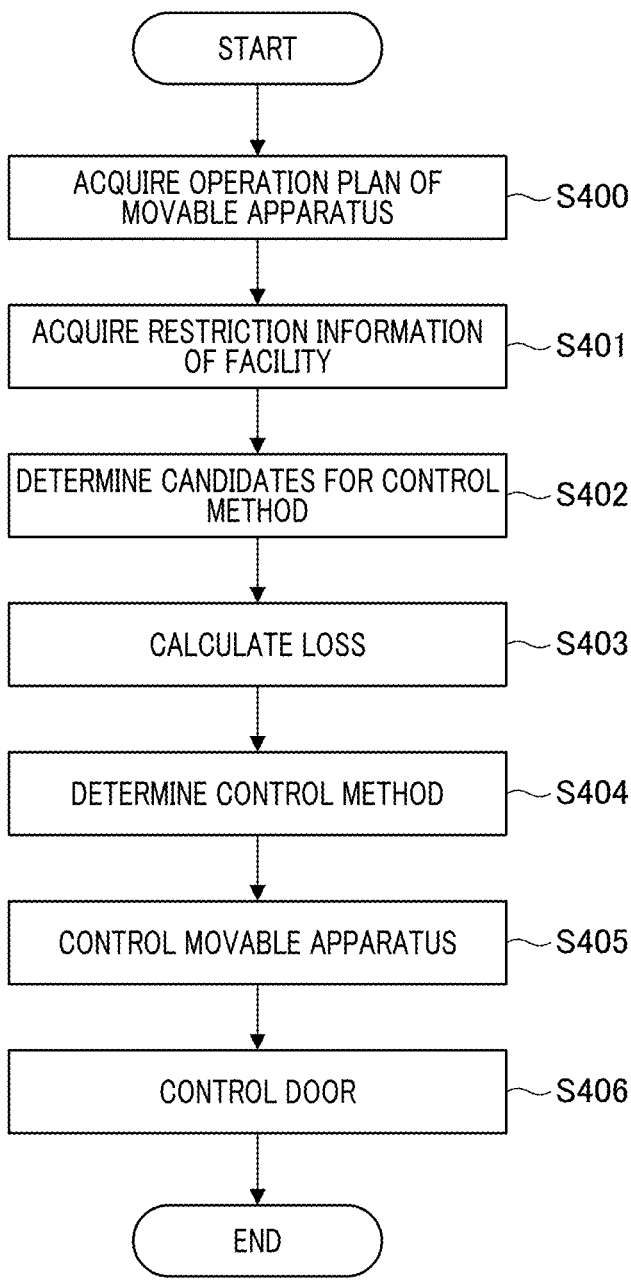
FIG. 4 is an explanatory flowchart of an example of an information processing method in the information processing device 100 according to First Embodiment.

FIG. 4 is an explanatory flowchart of an example of an information processing method in the information processing device 100 according to First Embodiment. Each of the steps of the flowchart in FIG. 4 is processed by the CPU 311 executing the computer program stored in the memory (the ROM 312 or the like) serving as a storage medium.

The information processing device 100 starts the flow in FIG. 4 at an arbitrary timing while the movable apparatuses 120 to 122 are in operation, and the information processing device 100 regularly performs the flow in FIG. 4. In Step S400 (movable apparatus operation plan acquiring step), the movable apparatus operation plan acquisition unit 210 acquires operation plan information on the plurality of movable apparatuses 120 to 122 from the movable apparatus operation management unit 260.

At this time, first, identification information on the movable apparatuses 120 to 122 scheduled to utilize the automatic door 110 is acquired, and operation plan of each of the movable apparatuses 120 to 122 is acquired on the basis of the identification information. Acquired information is position/posture information at the point of time when the information is acquired, a future scheduled movement path, a scheduled time of utilizing the automatic door 110, and operation details information on the movable apparatuses 120 to 122 for each of the movable apparatuses 120 to 122 scheduled to utilize the automatic door 110.

Operation details information on the movable apparatuses 120 to 122 is information on the purpose of operation of the movable apparatuses 120 to 122 and operation targets. For example, if the purpose is to transport an article, it may be identification information on the article, a transportation source, a transportation destination, a transportation time limit, and the like. If the purpose of operation is security, it may be a security target region, a security time limit, and the like. If the purpose of operation is cleaning, it may be a cleaning target region, a cleaning time limit, and the like.

In addition, operation details information on the movable apparatuses 120 to 122 includes loss information in the case in which the automatic door 110 cannot be utilized. The movable apparatus operation management unit 260 defines in advance a loss caused if the automatic door 110 cannot be operated in terms of amount of money, points, or the like and retains it as the loss information.

In First Embodiment, the amount of money includes points and the like. In addition, for example, if an article is transported, values defining amounts of loss (loss amounts) caused if transportation of an article is delayed in terms of amount of money for each delay time are adopted as loss information.

If the purpose of the movable apparatuses is security, a loss caused if theft or the like has occurred is defined in terms of amount of money and retained as loss information. If the purpose of the movable apparatuses is cleaning, costs required for extended cleaning due to delay and a loss caused due to events caused by not being cleaned (decrease in the number of clients, increase in complaints, or the like) are defined in terms of amount of money and adopted as loss information.

In Step S401 (restriction information acquiring step), the facility restriction information acquisition unit 220 acquires the restriction information related to the facility when the movable apparatuses 120 to 122 utilize the automatic door 110 as a facility, for example, from the facility.

The restriction information includes combinations of the movable apparatuses 120 to 122 (the number of apparatuses, and the like) capable of utilizing the automatic door 110 at the same time, an operation time (opening/closing time) during which the automatic door 110 can be continuously operated, required conditions for opening and closing the automatic door 110, and the like. In addition, the restriction information also includes a history of the automatic door 110 being utilized by the movable apparatuses 120 to 122 thus far, loss information generated when the automatic door 110 is operated, and the like.

Loss information includes values defining costs for operating the automatic door 110 and damage to objects other than the automatic door 110 caused by operating it in terms of amount of money for each operation time. For example, if the automatic door 110 installed in a freezing storage warehouse is assumed, opening the automatic door will increase the temperature inside the freezing storage warehouse.

Temperature information inside the warehouse is defined in accordance with a door opening time. Accordingly, costs for lowering the temperature again in accordance with the door opening time, the amount of damage to articles inside the warehouse based on the temperature information, and the amount of repair in the case of repairing damage are acquired as loss information. In this manner, the loss calculation unit 240 also calculates a loss caused by controlling the facility for the movable apparatuses utilizing the facility.

In Step S402, the control method candidate determination unit 230 determines candidates for the control details of the automatic door and the movable apparatuses. For example, candidates for the control details are determined by the following five methods.

In a first method, the facility is operated at a timing prioritizing a request of the facility included in the restriction information on the facility acquired by the facility restriction information acquisition unit 220, and the control details are determined such that the movable apparatuses move to utilize the facility in accordance therewith.

The facility according to First Embodiment is the automatic door 110, and if a request of the automatic door is prioritized, it is desirable that the automatic door be closed. Thus, in the first method according to First Embodiment, for example, the automatic door 110 operates to be opened and closing at a certain time interval, and the movable apparatuses 120 to 122 utilize the automatic door 110 only when they are in operation.

Regarding the interval of operating the automatic door 110, the average number of times of operation in one day is calculated, for example, from the history of utilization of the automatic door 110 by the movable apparatuses 120 to 122 in the past acquired by the facility restriction information acquisition unit 220, and the operation time interval is calculated from the average number of times of operation.

In a second method, the control details of the movable apparatus 120 and the facility are determined such that movement of the movable apparatuses 120 to 122 is prioritized. Regarding a utilization order of the movable apparatuses 120 to 122 utilizing the facility, the operation priority of the movable apparatuses is determined from the operation details information on the movable apparatuses 120 to 122 acquired in Step S400, and the facility is utilized in descending order of priority.

Operation details and the priority of the movable apparatuses 120 to 122 are defined in advance. Each of the movable apparatuses 120 to 122 issues an operation request to the facility when utilizing the automatic door 110, and the automatic door 110 operates every time it receives an operation request.

In a third method, the control details are determined such that the facility is utilized in the order as in the operation plan of each of the movable apparatuses acquired by the movable apparatus operation plan acquisition unit 210 in Step S400. At this time, regarding each of the movable apparatuses, if there is a combination of the movable apparatuses utilizing the facility at the same time within a certain period of time, the movable apparatuses utilize the facility at the same timing.

Thus, in a combination of the movable apparatuses utilizing the facility within a certain period of time, a movable apparatus which is scheduled to utilize the automatic door 110 first arrives at a place in the vicinity of the automatic door 110 and stands by for arrival of another movable apparatus of the combination in the vicinity of the automatic door 110. The length of a predetermined period of time for utilizing the automatic door 110 at the same time is determined using the operation time (opening/closing time), during which the automatic door 110 can be continuously operated, of the restriction information on the automatic door 110 acquired by the facility restriction information acquisition unit 220.

In a fourth method, the control details are determined such that allowing as many movable apparatuses as possible to move at a time is prioritized. A combination of the movable apparatuses 120 to 122 utilizing the automatic door 110 at the same time is determined from information on combinations (the number of apparatuses, and the like) of the movable apparatuses capable of utilizing the automatic door 110 at a time, in facility restriction information acquired by the facility restriction information acquisition unit 220 in Step S401. That is, movable apparatuses which will become control targets are determined on the basis of the restriction information.

In the determined combinations, the order is determined such that the automatic door 110 is utilized in the order of the combinations with the larger number of apparatuses. The automatic door 110 is operated in accordance with an operation request from the movable apparatuses 120 to 122.

In a fifth method, the control details are determined such that movement of a large-sized movable apparatus which may be difficult to move is prioritized. A combination of the movable apparatuses utilizing the facility at the same time is determined from information on combinations of the movable apparatuses capable of utilizing the automatic door 110 at a time, in the facility restriction information acquired by the facility restriction information acquisition unit 220 in Step S401.

In the determined combinations, the order is determined such that the automatic door 110 is utilized in the order of combinations with the smaller number of apparatuses. The automatic door 110 is operated in accordance with an operation request from the movable apparatuses 120 to 122.

In Step S403 (loss calculating step), the loss calculation unit 240 calculates each of the losses for each of the control method candidates determined by the control method candidate determination unit 230 in Step S402. That is, in Step S403, regarding a plurality of candidates for a control method for the movable apparatuses and the facility for the movable apparatuses utilizing the facility on the basis of at least the restriction information, a loss caused if each of the candidates is performed is calculated.

Regarding this loss, a loss caused by operating the automatic door 110 and a loss caused due to delay in movement of the movable apparatuses 120 to 122 are calculated and added up to obtain a loss of each of the control method candidates.

A loss caused by operating the automatic door 110 is obtained by adding up costs of operating the automatic door 110 and damage which is caused by operating the automatic door 110 and converted into an amount of money, in the restriction information on the automatic door 110 acquired in Step S401.

Regarding the amount of loss obtained by converting damage caused by operating the automatic door 110 into an amount of money, first, the operation time of the automatic door 110 in each of the candidates for the control details determined in Step S402 is calculated. The amount of loss is determined from the operation time based on the loss amount for each operation time in the restriction information on the automatic door 110 acquired in Step S401.

A loss caused due to delay in movement of the movable apparatuses 120 to 122 is calculated based on the loss information in the case in which the automatic door 110 cannot be immediately utilized, in the operation details information on the movable apparatuses 120 to 122 acquired in Step S400.

First, for each of the control method candidates determined in Step 302, a standby time for utilization of the automatic door 110 is calculated for each of the movable apparatuses. A loss caused if movement of the movable apparatuses 120 to 122 is delayed is calculated based on the standby time from the amount of loss (defined in advance) in the case in which the automatic door 110 cannot be immediately utilized. At this time, the loss calculation unit 240 calculates a loss caused by each of the movable apparatuses standing by for utilization of the facility.

In Step S404 (control method determining step), the control method determination unit 250 determines the control method from the control method candidates determined by the control method candidate determination unit 230 in Step S402. At this time, the control method is determined from the foregoing candidates on the basis of the loss of each of the control method candidates calculated by the loss calculation unit 240 in Step S403. In First Embodiment, a control method having a minimized amount of loss is determined.

In Steps S405 and S406, the control unit 270 controls each of the movable apparatuses 120 to 122 and the automatic door 110 (facility) on the basis of the control method determined by the control method determination unit 250 in Step S404, and thereafter, the flow in FIG. 4 ends. Thus far, an example of a processing flow executed by the information processing device according to First Embodiment has been described.

According to the information processing method of First Embodiment, in consideration of both the losses caused by operating the automatic door 110 and the movable apparatuses 120 to 122, the control method in which the amount of entire loss is minimized can be determined.

In First Embodiment, an example in which an automatic door installed at a doorway of a freezing storage warehouse is assumed as a facility has been described, but it is not limited to this. The installation place of the facility is not limited, such as inside a factory or a commercial facility, and it can be applied by setting loss information assumed in each installation place to each of the movable apparatuses.

In the case inside a factory, a delay may occur in arrival of an article due to standby of the movable apparatus, and a loss caused from the delay is calculated. In the case of a commercial facility, a delay may occur in arrival of an article due to standby of the movable apparatus, and an expected profit can be calculated as a loss due to the delay causing a client of the commercial facility to be dissatisfied and refrain from visiting.

Alternatively, regarding the loss information included in the operation plan information acquired by the movable apparatus operation plan acquisition unit 210 in Step S400, an example of loss information defined in terms of amount of money corresponding to the delay time of the movable apparatus has been described, but it is not limited to this. If there is a loss which is caused in a lump when a delay occurs even for a short period of time, the amount of loss may be defined regardless of the delay time, and this may be adopted as the loss information.

In addition, the loss information is also not limited to the foregoing example and is set in accordance with the installation place of the facility or the operation details of the movable apparatuses. The movable apparatuses 120 to 122 have been described as an example of autonomously traveling movable apparatuses, but it is not limited to this.

It need only be a movable apparatus capable of acquiring operation information, and it may be a guide-traveling movable apparatus or may be a movable apparatus operated by a person. In addition, a person carrying an information processing device (a compact information processing terminal or the like) may be treated as a movable apparatus, or a movable apparatus with a person riding therein may be adopted. In the case of a movable apparatus with a person riding therein, although it is driven by a person, the movable apparatus may have a function of autonomous traveling or driving support. In addition, the movable apparatus may be remotely operated by a person.

Alternatively, regarding the first method in Step S402, it has been described that the time interval of operating the automatic door 110 is calculated from the average number of times of operation in one day, but it is not limited to this and may be determined by other methods. For example, the time interval of operating the automatic door 110 may be determined using the loss information of the restriction information acquired by the facility restriction information acquisition unit 220.

In this case, an operation time interval is set such that a loss caused by operating the facility becomes a threshold or smaller. The threshold may be determined by a user or may be determined by calculating the average amount of loss from the operation history in the past. Without providing a threshold, each of the amounts of loss may be calculated by setting a plurality of operation times, and the operation time having the smallest loss amount may be selected.

An example of a building facility has been described, but it may be applied to controlling a gate or the like in a facility such as an outdoor parking lot, for example, instead of a building, or a facility such as a door or a gate inside a movable apparatus (for example, a train, a vessel, or an aircraft) may be a control target.

Second Embodiment

In First Embodiment, regarding an example having a facility as an automatic door, a method for determining a control method when movable apparatuses pass through an automatic door has been described. In Second Embodiment, if the facility is an elevator, a method for determining a control method when a movable apparatus utilizes the elevator will be described.

If the movable apparatus utilizes the elevator, a loss such as power consumption is caused in the facility due to operation of the elevator. On the other hand, when the movable apparatus utilizes the elevator, there is a standby time of waiting for arrival of the elevator. A loss caused due to this standby time is calculated and used for determining the control method. Only the points different from First Embodiment will be concisely described. In Second Embodiment, since the diagram of the constitution and the processing flow are similar to those of First Embodiment, a part of the description thereof will be omitted.

The control method candidates determined by the control method candidate determination unit 230 in Step S402 are determined by the same method as that of First Embodiment. However, the facility will be described regarding an elevator in place of an automatic door.

First, if the control details are determined such that the facility is operated at a timing prioritizing a request of the facility and the facility moves to allow the movable apparatus to utilize it, the elevator operates in accordance with the order of calls and the movable apparatus which can ride the elevator rides it and moved. The movable apparatus which cannot ride it stands by at the place, calls the elevator again, rides it when it arrives, and moves.

Second, if the control details of the movable apparatuses 120 to 122 and the facility are determined such that movement of the movable apparatuses 120 to 122 is prioritized over the facility, the movement priority order of the movable apparatus is determined from the operation details of the movable apparatuses 120 to 122 similarly to First Embodiment. The elevator is operated in accordance with the determined movement order. In this case, it is also assumed that the movable apparatuses 120 to 122 which have already ridden the elevator temporarily leave the elevator and stand by.

Third, if the control details are determined such that the facility is utilized in the order as in the operation plan of each of the movable apparatuses acquired by the movable apparatus operation plan acquisition unit 210 in Step S400, the elevator is called as soon as the movable apparatus arrives at a place in the vicinity of the elevator. Further, the elevator operates in accordance with the order of calls. At this time, when the movable apparatus arrives at a place in the vicinity of the elevator, if there is another movable apparatus scheduled to arrive at the same floor within a certain period of time, it waits arrival of the movable apparatus and rides the elevator.

Fourth, if the control details are determined such that allowing many movable apparatuses to move at a time is prioritized, they are performed as follows, for example. That is, combinations of the movable apparatuses riding the elevator at a time and the movement order of the combinations are decided in advance from information on combinations of the movable apparatuses capable of riding the elevator at a time, in the facility restriction information acquired in Step S401.

The movement order is determined such that the movable apparatuses move first in accordance with the combinations having more movable apparatuses which can ride the elevator at a time. The elevator is operated in accordance with the combinations of the movable apparatuses and the movement order which have been determined.

Fifth, if the control details are determined such that movement of a large-sized movable apparatus which may be difficult to move is prioritized, they are performed as follows, for example. That is, the elevator is operated such that the movable apparatuses having no combination preferentially move on the basis of the combination of the movable apparatuses which can ride the elevator at a time, in the facility restriction information acquired by the facility restriction information acquisition unit 220 in Step S401.

In Step S403, the loss calculation unit 240 calculates each of the losses for each of the control method candidates determined by the control method candidate determination unit 230. In Second Embodiment, a loss caused due to delay in movement of the movable apparatuses 120 to 122 is calculated in terms of amount of money.

Similar to First Embodiment, calculation is performed based on the loss information in the case in which the automatic door 110 cannot be utilized, in the operation details information on the movable apparatuses 120 to 122 acquired in Step S400. For each of the movable apparatuses 120 to 122, a standby time until it rides the elevator from arrival in the vicinity of the elevator is calculated. The amount of loss due to standby of each of the movable apparatuses 120 to 122 is calculated from the standby time.

In Second Embodiment described above, the control method in the case in which the facility is an elevator is determined. According to Second Embodiment, it is possible to determine a control method for the facility and the movable apparatuses, in which not only the priority of the movable apparatuses but also a loss is added.

If there is a person utilizing the elevator, the loss calculated by the loss calculation unit 240 may include a loss caused due to standby for the person utilizing the elevator, in addition to a loss caused due to standby for the movable apparatus utilizing the elevator.

For example, a loss caused due to delay in movement of a person and consequent delay in starting work performed by the person is calculated. For example, the sales of products expected to be produced by the person may be calculated as a loss, or if an additional work time corresponding to delay is required, personnel expenses corresponding to the additional work time of the person himself/ herself may be adopted as a loss.

In the foregoing description, a loss caused by operating the elevator has not been taken into consideration. However, if the cost of operating the elevator is extremely large, a loss caused by operating the elevator may be calculated.

Third Embodiment

In First and Second Embodiments, control methods for a facility and movable apparatuses have been described in consideration of a loss caused by operating the facility and the movable apparatuses. In Third Embodiment, a method for notifying a manager of a facility and movable apparatuses or surrounding persons of a control method or a control reason for the facility and the movable apparatuses will be described. Only the points different from First and Second Embodiments will be concisely described.

Figure 5:
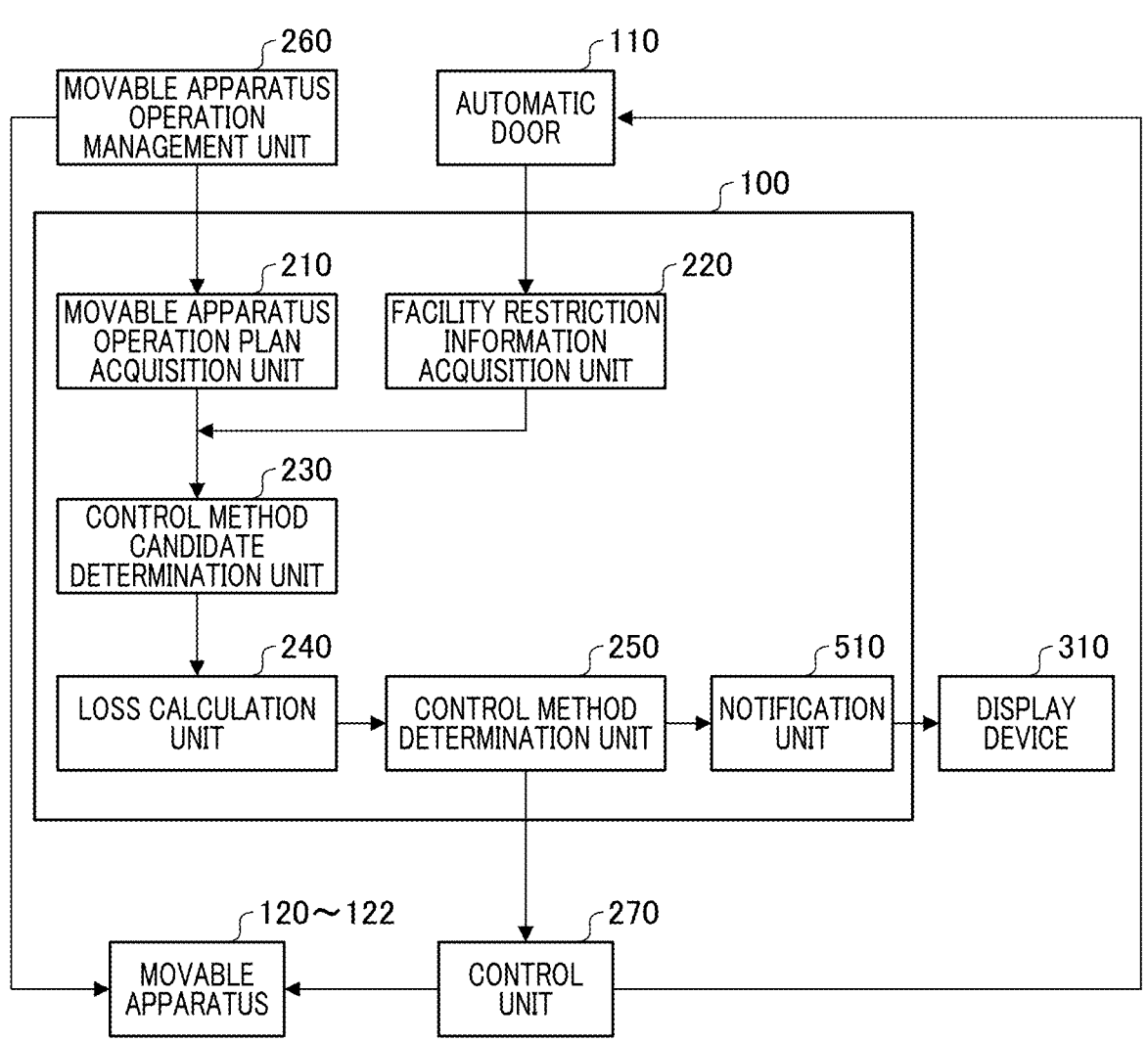
FIG. 5 is a functional block diagram of the information processing device 100 according to Third Embodiment.
Figure 6:
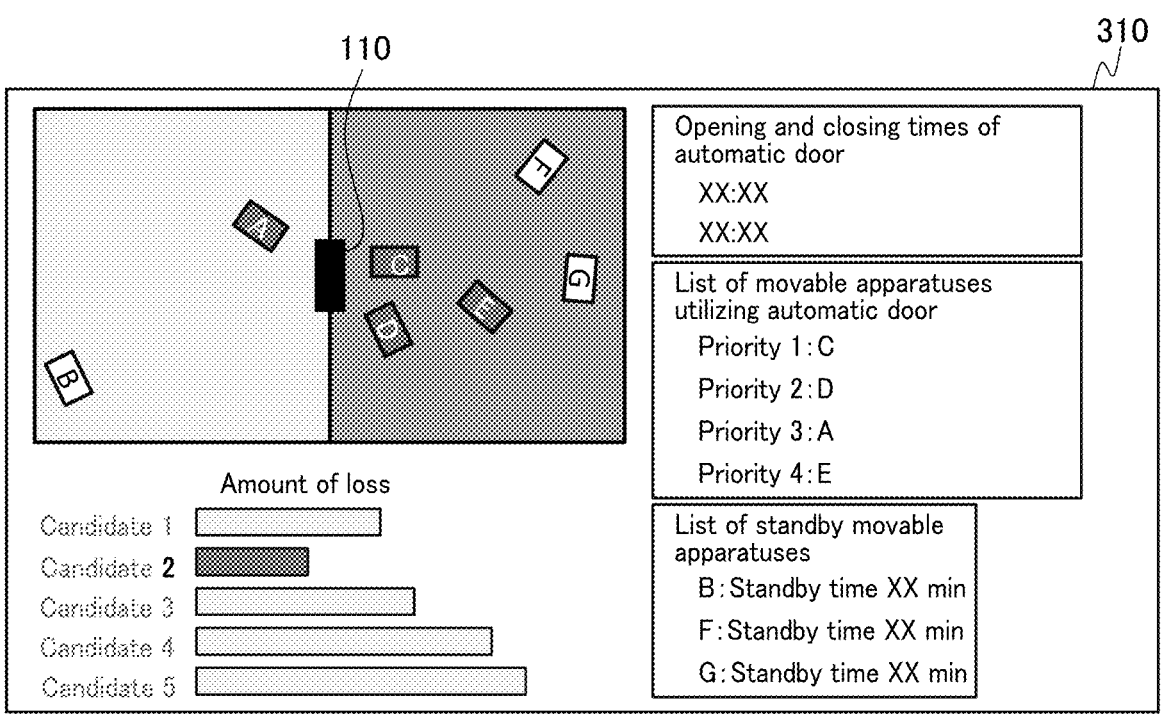
FIG. 6 is a view illustrating a display example of a display device displaying processing details of the information processing device 100 according to Third Embodiment.

FIG. 5 is a functional block diagram of the information processing device 100 according to Third Embodiment. The information processing device 100 has a notification unit 510, and the notification unit 510 causes the display device 310 such as a liquid crystal display to display the control method, for example. FIG. 6 is a view illustrating a display example of the display device displaying processing details of the information processing device 100 according to Third Embodiment and illustrates an example of a GUI displaying processing details of the information processing device 100 and an operation condition of the movable apparatuses.

In FIG. 6, a condition in which there is the automatic door 110 in a central portion of the screen displayed in the GUI and a plurality of movable apparatuses are operated on both sides thereof is displayed. On the lower side of the screen, the amounts of loss calculated in Step S403 are displayed with bars with respect to the control method candidates determined in Step S402, and the fact that the control method determined in Step S404 is Candidate 2 is displayed.

Alternatively, a list of the movable apparatuses utilizing the automatic door in accordance with the control method of Candidate 2 is displayed on the right side in the screen as "List of movable apparatuses utilizing automatic door". In addition, a list of standby movable apparatuses is displayed on the lower right side in the screen as "List of standby movable apparatuses". Moreover, standby times are displayed for the standby movable apparatuses. In this manner, the manager of the facility and the movable apparatuses can confirm the determined control method and the amount of loss which becomes the basis for determination in Step S404 from the details displayed in the GUI.

Alternatively, the manager can apply an additional duty instruction or the like to the standby movable apparatuses by displaying the standby times of the standby movable apparatuses together.

Figure 7:
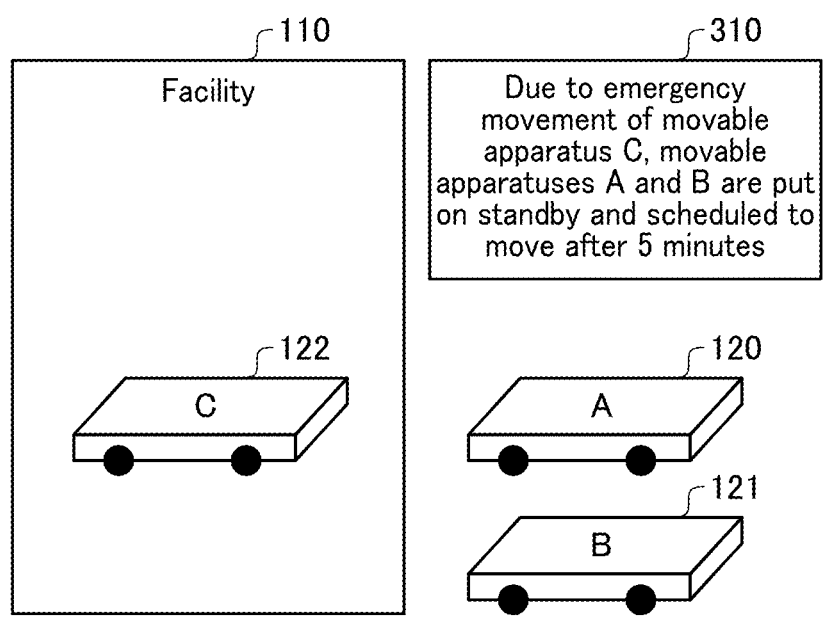
FIG. 7 is a view illustrating usage or the like of the display device according to Third Embodiment.

FIG. 7 is a view illustrating an example of usage of the display device according to Third Embodiment. The display details of the display device in FIG. 7 are simplified display details for the manager of the automatic door 110 and the movable apparatuses 120 to 122 illustrated in FIG. 6. The display device 310 displays the control details of the automatic door 110 and the movable apparatuses 120 to 122 determined in Step S404.

Alternatively, as illustrated in FIG. 7, the display device 310 is installed near the elevator or the like as a facility. In addition, the display device 310 simply displays identification information A to identification information C of the movable apparatuses which are currently operated, future movement schedules of the movable apparatuses based on the control method determined by the control method determination unit 250, scheduled times of utilization of the facility by the respective movable apparatuses, and the like.

Due to such a constitution, even if the manager of the automatic door 110 and the movable apparatuses 120 to 122 is at a different distanced place, information necessary for persons using the display device, such as other users of the automatic door 110 can be displayed.

In Third Embodiment, the manager of the automatic door 110 and the movable apparatuses 120 to 122 and other users of the facility can know specific control details by providing the notification unit 510. Accordingly, a person around the facility can ascertain the operation state of the facility in real time, and erroneous operation and the like can be quickly ascertained. Here, the notification unit 510 notifies the users of at least one of the candidate for the control method, the loss, and determined control method.

The place where the display device 310 is installed is not limited to the place near the automatic door or the elevator as a facility. It need only be installed at a place which can be easily seen by a person utilizing the facility or a person managing the facility thereafter, such as a path in the middle of a way toward the facility or a management office of the facility.

Alternatively, the details displayed by the display device 310 is not limited to the foregoing description, and current circumstances such as the standby time of each of the movable apparatuses or the current location of each of the movable apparatuses may be displayed more specifically. In addition, the progress or the schedule of the operation circumstances of the facility may be displayed. By displaying the standby times, if the standby time is long, the standby times can be effectively utilized, such as requesting the movable apparatus for other work.

Alternatively, since movement of other movable apparatuses is prioritized, if another movable apparatus is standing by or the like, a reason therefor may be notified. By notifying standby or a reason for delay, it is possible for surrounding persons to avoid feeling unnecessary stress and misunderstanding of a malfunction. The notification of the notification unit 510 is not limited to image display and audio notification may be issued.

Alternatively, in the foregoing Example, candidates for the control method are determined by the control method candidate determination unit 230, and the control method is determined by the control method determination unit 250 after the loss calculation unit calculates a loss. However, if there are few choice alternatives of the control method, a loss may be calculated for all the control methods without determining the candidates for the control method by the control method candidate determination unit 230, and the control method may be determined on the basis of the result thereof. Alternatively, an outline of the control method may be determined by the control method candidate determination unit 230, and details of the control method may be determined by the control method determination unit 250 after the loss calculation unit calculates a loss.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing device through a network or various storage media. Then, a computer (or a CPU, an MPU, or the like) of the information processing device may be configured to read and execute the program. In such a case, the program and the storage medium storing the program configure the present invention.

Alternatively, for example, the present invention includes those realized using at least one processor or circuit configured to function of the embodiments explained above. Distributed processing may be performed using a plurality of processors.

This application claims the benefit of Japanese Patent Application No. 2022-181547, filed on Nov. 14, 2022, which is hereby incorporated by reference herein in its entirety.

What is claimed is:

1. An information processing device comprising:

at least one processor or circuit configured to function as:

a movable apparatus operation plan acquisition unit configured to acquire operation plans of a plurality of movable apparatuses;

a restriction information acquisition unit configured to acquire restriction information on a facility to be utilized by the movable apparatuses, wherein the facility includes at least one of an automatic door, an automatic shutter, an automatic gate, or an elevator, and wherein the restriction information includes at least one of combinations of the movable apparatuses capable of utilizing the facility at a same time, an operation time during which the facility can be continuously operated, or a history of the facility being utilized by the movable apparatuses;

a loss calculation unit configured to calculate, regarding a plurality of candidates for control methods for the movable apparatuses and the facility for the movable apparatuses utilizing the facility on the basis of at least the restriction information, a loss caused in a case in which each of the candidates is performed;

a control method determining unit configured to determine a control method from the candidates on the basis of the losses calculated by the loss calculation unit; and a control unit configured to output control details to control the movable apparatuses and the facility on the basis of the control method determined by the control method determination unit.

2. The information processing device according to claim 1, wherein the loss calculation unit calculates a loss caused by each of the movable apparatuses standing by for utilization of the facility.

3. The information processing device according to claim 1, wherein the loss calculation unit calculates a loss caused by controlling the facility for the movable apparatuses utilizing the facility.

4. The information processing device according to claim 1, wherein the control method determining unit determines a movable apparatus which becomes a control target on the basis of the restriction information.

5. The information processing device according to claim 1, wherein the control method determining unit determines a timing for each of the movable apparatuses utilizing the facility.

6. The information processing device according to claim 1, wherein the at least one processor or circuit is further configured to function as:

a notification unit configured to notify a user of at least one of the candidate, the calculated loss, or the determined control method.

7. An information processing method comprising acquiring movable apparatus operation plans of a plurality of movable apparatuses;

acquiring restriction information on a facility to be utilized by the movable apparatuses, wherein the facility includes at least one of an automatic door, an automatic shutter, an automatic gate, or an elevator, and wherein the restriction information includes at least one of combinations of the movable apparatuses capable of utilizing the facility at a same time, an operation time during which the facility can be continuously operated, or a history of the facility being utilized by the movable apparatuses;

calculating loss regarding a plurality of candidates for a control method for the movable apparatuses and the facility for the movable apparatuses utilizing the facility on the basis of at least the restriction information, a loss caused in a case in which each of the candidates is performed;

determining a control method from the candidates on the basis of the losses; and outputting control details to control the movable apparatuses and the facility on the basis of the determined control method.

8. A non-transitory computer-readable storage medium storing a computer program including instructions for executing following processes:

acquiring movable apparatus operation plans of a plurality of movable apparatuses;

acquiring restriction information on a facility to be utilized by the movable apparatuses, wherein the facility includes at least one of an automatic door, an automatic shutter, an automatic gate, or an elevator, and wherein the restriction information includes at least one of combinations of the movable apparatuses capable of utilizing the facility at a same time, an operation time during which the facility can be continuously operated, or a history of the facility being utilized by the movable apparatuses;

calculating loss regarding a plurality of candidates for a control method for the movable apparatuses and the facility for the movable apparatuses utilizing the facility on the basis of at least the restriction information, a loss caused in a case in which each of the candidates is performed;

determining a control method from the candidates on the basis of the losses; and outputting control details to control the movable apparatuses and the facility on the basis of the determined control method.

\* \* \* \* \*